April 5, 1949.　　　　A. DOWRELIO　　　　2,466,085
HOT TOP TRAY

Filed Jan. 7, 1947　　　　　　　　　　2 Sheets-Sheet 1

Inventor
Angelo Dowrelio,
By McMorrow, Berman & Davidson
Attorneys

April 5, 1949.　　　　A. DOWRELIO　　　　2,466,085
HOT TOP TRAY
Filed Jan. 7, 1947　　　　2 Sheets-Sheet 2
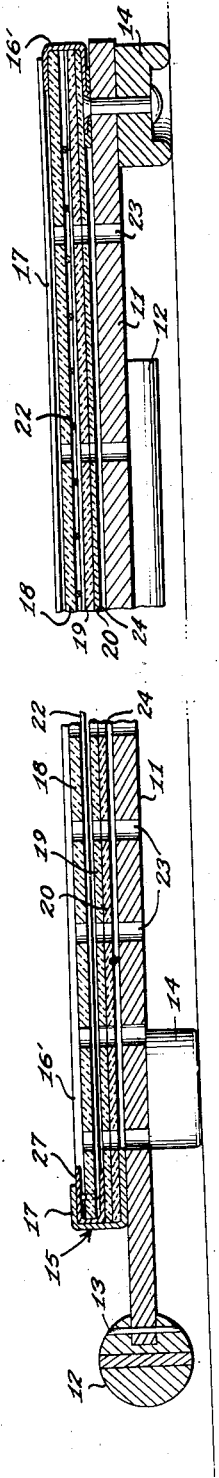
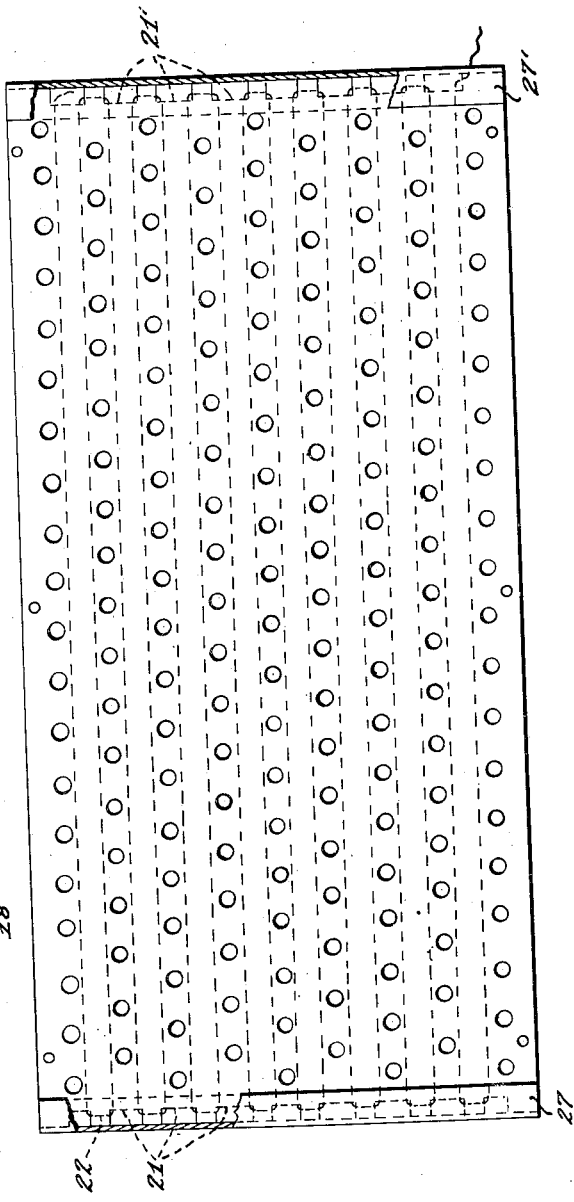
Inventor
Angelo Dowrelio,
By McMorrow, Berman and Davidson
Attorneys

UNITED STATES PATENT OFFICE 2,466,085

HOT TOP TRAY

Angelo Dowrelio, Crockett, Calif.

Application January 7, 1947, Serial No. 720,582

1 Claim. (Cl. 219—19)

This invention relates to electrical heating appliances, and more particularly to an electrically heated tray which may also be employed as a table pad to prevent hot dishes and pots from marring the finish on tables.

A main object of the invention is to provide a novel and improved food tray device which is very simple in construction, neat in appearance and useful for a wide variety of food serving purposes.

A further object of the invention is to provide an improved tray which may be employed either as a table pad to protect the finish of a table against injury by hot objects, or may be employed as a food warmer to keep food receptacles or food articles warm, said tray being inexpensive to manufacture and having only a few simple parts.

Further objects and advantages of the invention will become apparent from the following description and claims, and from the accompanying drawings, wherein:

Figure 3 is an enlarged cross-sectional view taken on line 3—3 of Figure 1.

Figure 4 is an enlarged cross-sectional view taken on line 4—4 of Figure 1.

Figure 5 is a plan view of the heater member employed in the tray device of Figure 1.

Figure 1:
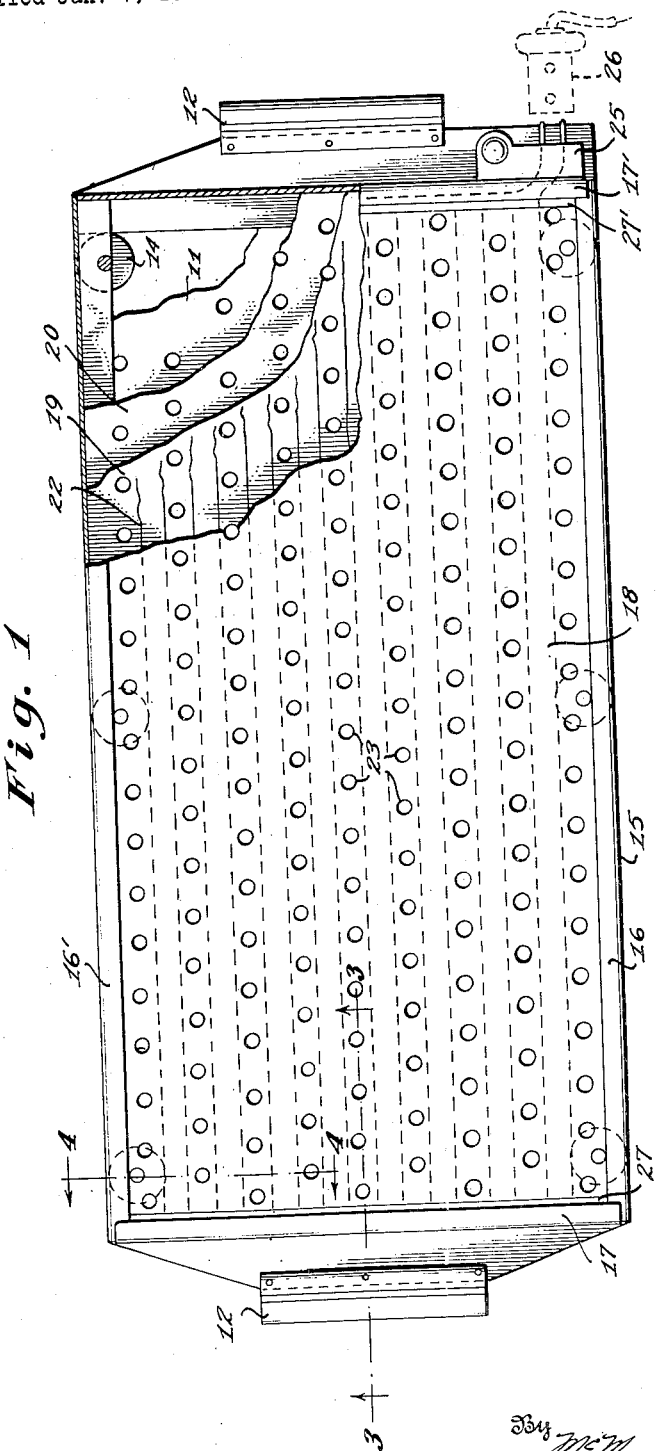
Figure 1 is a top plan view of a tray device constructed in accordance with the present invention, parts of the device being shown broken away to reveal details of interior construction.
Figure 2:
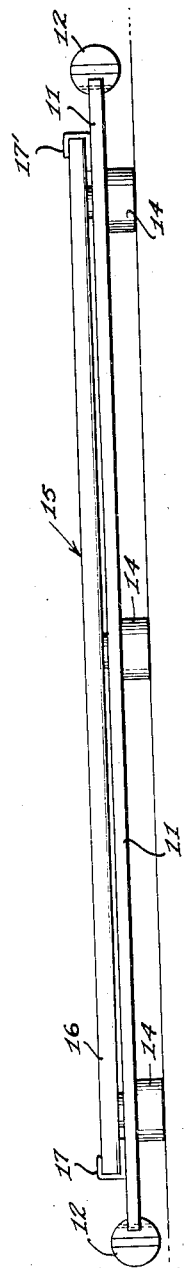
Figure 2 is a side elevational view of the tray device of Figure 1.

Referring to the drawings, 11 designates a generally rectangular base member of suitable rigid material which is a poor heat conductor, such as wood, pressed board, plastic, or the like. Secured to each end of base 11 is a handle 12, the handles being of any desired decorative material including metal, and which may be built of several layers of material such as wood and metal fastened together and turned to cylindrical shape, as shown in the drawings. The cylindrical handles are longitudinally grooved to receive the end edges of base 11 and are secured thereto by pins 13 as shown in Figure 3. Secured to the bottom of base 11 are a plurality of supporting feet 14 which support base 11 above the table surface.

Secured to the top surface of base 11 is a rectangular frame 15 whose members are channel-shaped in cross-section, said frame comprising longitudinal side members 16, 16' and end members 17 and 17' overlapped with and secured to side members 16 and 16' at the corners of the frame as by welding or soldering. Positioned in the frame and retained in the channel-shaped recesses defined by the frame members are three superimposed rectangular members 18, 19 and 20 of suitable rigid heat-resisting electrically non-conducting material, such as mica, porcelain, or other well known rigid insulating material. The top member 18 is notched at its ends as shown at 21, 21', and wound on said top member 18 is a heater winding 22.

The notches 21, 21' define a plurality of spaced fingers at the ends of top member 18. The turns of winding 22 are positioned at the under surface of member 18, the turns being looped at their ends over said fingers. The ends of the wound heater element thus defined are covered by respective channel-shaped members 27, 27' of suitable material which is both electrically and thermally insulating. Winding 22 comprises Nichrome wire or the like.

Base 11 and the members 18, 19 and 20 are formed with a plurality of vertically aligned perforations providing air circulation passages shown at 23 and extending substantially over the entire area of the tray in relatively closely spaced and uniformly distributed relationship. A small air space is provided between bottom member 20 and base 11 as shown at 24. At one corner of the tray is a male plug member 25 to which the terminals of heater winding 22 are connected, said plug member being adapted to be connected to a source of current by a female plug member shown at 26.

When heater winding 22 is disconnected from the source of current the tray may be employed as a table pad, since the air space defined beneath the tray by the supporting feet 14 and the additional air space 24 provide effective heat insulation for preventing damage to the table surface by hot objects placed on the tray.

When the tray is employed as a food warmer, heater winding 22 is connected to a source of current and the above mentioned air spaces again serve to insulate the heater portion of the tray from the table surface. Circulation of air through passages 23 dissipates part of the heat generated by winding 22 and prevents the temperature of the tray from rising to an excessive value. Said passages also function to allow air circulation through the tray when said tray is employed as a table pad.

While a specific embodiment of a tray device has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

A tray comprising a base, feet mounted upon the base, a frame mounted upon the base near its marginal edges, said frame comprising rigid side channels and rigid end channels, the end channels receiving the extremities of the side channels therein and retaining the said channels spaced from the base, a plurality of sheets arranged in superposed relation and held within the frame and having their longitudinal edges projecting into the longitudinal channels and their ends projecting into the transverse channels, said sheets being formed of electrical and heat insulating material, the uppermost sheet being provided at its opposite ends with spaced notches forming fingers between the same, a resistance element arranged next to and beneath the uppermost sheet and having longitudinal strands positioned beneath the uppermost sheet and transverse portions extending over the fingers, insulating strips covering the ends of the superposed sheets and held within the end channels, and a connection for the ends of the resistance element.

ANGELO DOWRELIO.

REFERENCES CITED

The following references are of record in the file of this patent:

UNITED STATES PATENTS

| Number | Name | Date |
|---|---|---|
| 1,852,398 | Bersted | Apr. 5, 1932 |

FOREIGN PATENTS

| Number | Country | Date |
|---|---|---|
| 237,131 | Great Britain | July 23, 1925 |
| 498,218 | France | Jan. 6, 1920 |
| 643,861 | France | Sept. 25, 1928 |